United States Patent
Ishida et al.

(10) Patent No.: US 11,453,589 B2
(45) Date of Patent: Sep. 27, 2022

(54) METHOD OF PRODUCING BORON NITRIDE POLYCRYSTAL, BORON NITRIDE POLYCRYSTAL, CUTTING TOOL, WEAR-RESISTING TOOL, AND GRINDING TOOL

(71) Applicant: Sumitomo Electric Industries, Ltd., Osaka (JP)

(72) Inventors: Yuh Ishida, Itami (JP); Hitoshi Sumiya, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 491 days.

(21) Appl. No.: 15/763,320

(22) PCT Filed: Aug. 25, 2017

(86) PCT No.: PCT/JP2017/030478
§ 371 (c)(1),
(2) Date: Mar. 26, 2018

(87) PCT Pub. No.: WO2018/066261
PCT Pub. Date: Apr. 12, 2018

(65) Prior Publication Data
US 2019/0248652 A1    Aug. 15, 2019

(30) Foreign Application Priority Data
Oct. 6, 2016 (JP) .............. JP2016-198135

(51) Int. Cl.
*C01B 21/064* (2006.01)
*C04B 35/645* (2006.01)
(Continued)

(52) U.S. Cl.
CPC ........ *C01B 21/0648* (2013.01); *B23B 27/148* (2013.01); *B24D 3/346* (2013.01);
(Continued)

(58) Field of Classification Search
CPC . C01B 21/0648; B24D 3/346; B23B 2226/12; B23B 27/148; C04B 35/5831;
(Continued)

(56) References Cited

U.S. PATENT DOCUMENTS 4,289,503 A * 9/1981 Corrigan ............. C04B 35/5831
51/307
4,985,050 A * 1/1991 Cerutti ............... B22F 7/06
51/293

(Continued)

FOREIGN PATENT DOCUMENTS

JP    S47-034099 A    11/1972
JP    S49-27518 B      7/1974
(Continued)

OTHER PUBLICATIONS

Taniguchi et al., "Sintering of cubic boron nitride without additives at 7.7 GPa and above 2000° C.", Journal of Materials Research, vol. 14, No. 1, 1999, pp. 162-169 [Cited in OA dated Mar. 28, 2019 from EP counterpart application].
(Continued)

*Primary Examiner* — Pegah Parvini
*Assistant Examiner* — Ross J Christie
(74) *Attorney, Agent, or Firm* — Baker Botts L.L.P.; Michael A. Sartori (57) ABSTRACT

A method of producing a boron nitride polycrystal includes: a first step of obtaining a thermally treated powder by thermally treating a powder of a high pressure phase boron nitride at more than or equal to 1300° C.; and a second step of obtaining a boron nitride polycrystal by sintering the thermally treated powder under a condition of 8 to 20 GPa and 1200 to 2300° C.

5 Claims, 1 Drawing Sheet

(51) Int. Cl.
  *C04B 35/626* (2006.01)
  *C04B 35/5831* (2006.01)
  *B23B 27/14* (2006.01)
  *B24D 3/34* (2006.01)

(52) U.S. Cl.
  CPC ...... *C04B 35/5831* (2013.01); *C04B 35/6268* (2013.01); *C04B 35/62675* (2013.01); *C04B 35/645* (2013.01); *B23B 2226/12* (2013.01); *C01P 2002/60* (2013.01); *C01P 2002/76* (2013.01); *C01P 2006/90* (2013.01); *C04B 2235/386* (2013.01); *C04B 2235/5436* (2013.01); *C04B 2235/5445* (2013.01); *C04B 2235/5454* (2013.01); *C04B 2235/76* (2013.01); *C04B 2235/781* (2013.01); *C04B 2235/96* (2013.01)

(58) Field of Classification Search
  CPC .......... C04B 35/62675; C04B 35/6268; C04B 35/645; C04B 2235/386; C04B 2235/5436; C04B 35/5454; C04B 2235/76; C04B 2235/781; C04B 2235/96; C01P 2002/60; C01P 2002/76; C01P 2006/90
  See application file for complete search history.

(56) References Cited

U.S. PATENT DOCUMENTS

| | | | |
|---|---|---|---|
| 5,106,392 A * | 4/1992 | Slutz | B01J 3/062 51/295 |
| 2011/0230122 A1 | 9/2011 | Le Godec et al. | |
| 2015/0298290 A1* | 10/2015 | Ishida | B24D 3/008 51/307 |
| 2018/0029942 A1 | 2/2018 | Ishida et al. | |

FOREIGN PATENT DOCUMENTS

| | | |
|---|---|---|
| JP | S54-033510 A | 3/1979 |
| JP | H01-183468 A | 7/1989 |
| JP | H03-159964 A | 7/1991 |
| JP | H08-047801 A | 2/1996 |
| JP | H11-246271 A | 9/1999 |
| JP | 2014-034487 A | 2/2014 |
| JP | 2015-205789 A | 11/2015 |
| WO | 2016/129328 A1 | 8/2016 |

OTHER PUBLICATIONS

Dubrovinskaia et al., "Superhard nanocomposite of dense polymorphs of boron nitride: Noncarbon material has reached diamond hardness", Applied Physics Letters, vol. 90, pp. 101912-1 to 101912-3 [Cited in Communication dated Oct. 23, 2019 issued in JP Patent Application].

* cited by examiner

METHOD OF PRODUCING BORON NITRIDE POLYCRYSTAL, BORON NITRIDE POLYCRYSTAL, CUTTING TOOL, WEAR-RESISTING TOOL, AND GRINDING TOOL

TECHNICAL FIELD

The present invention relates to a method of producing a boron nitride polycrystal, the boron nitride polycrystal, a cutting tool, a wear-resisting tool, and a grinding tool. The present application claims a priority based on Japanese Patent Application No. 2016-198135 filed on Oct. 6, 2016, the entire content of which is incorporated herein by reference.

BACKGROUND ART

A cubic boron nitride (hereinafter, also referred to as "cBN") has a hardness second to that of diamond and is excellent in thermal stability and chemical stability. Particularly, a cBN sintered material is more stable with respect to an iron-based material than diamond, and is therefore used as a processing tool for such an iron-based material. There has been also known a binderless cBN sintered material having overcome decreased strength, decreased thermal resistance, and decreased thermal diffusion, which would otherwise result from inclusion of a binder in a cBN sintered material.

As a method of producing a cBN sintered material, it has been known that the cBN sintered material is obtained by: directly converting a boron nitride having a crystal state stably maintained under a normal pressure, into a cBN without using a catalyst under ultra high pressure and high temperature; and sintering it at the same time (direct conversion sintering method). Examples of such a boron nitride include a hexagonal boron nitride (hereinafter, also referred to as "hBN"). This method is indicated in each of Japanese Patent Laying-Open No. 47-034099 (Patent Document 1), Japanese Patent Laying-Open No. 03-159964 (Patent Document 2), and the like, for example.

A method of producing a cBN sintered material from a pyrolytic boron nitride (pBN) as a source material is indicated in each of Japanese Patent Laying-Open No. 54-033510 (Patent Document 3), Japanese Patent Laying-Open No. 08-047801 (Patent Document 4), and the like, for example. In this method, in order to obtain a cBN sintered material, conditions of 7 GPa and 2100° C. or more are required.

A method of obtaining a cBN sintered material under less strict conditions than the above-described conditions of 7 GPa and 2100° C. or more is indicated in each of Japanese Patent Publication No. 49-027518 (Patent Document 5) and Japanese Patent Laying-Open No. 11-246271 (Patent Document 6).

A method of obtaining a cBN polycrystal having a grain size of less than or equal to 100 nm using a fine-particle precursor powder is indicated in Japanese Patent Laying-Open No. 2015-205789 (Patent Document 7).

CITATION LIST

Patent Document

PTD 1: Japanese Patent Laying-Open No. 47-034099
PTD 2: Japanese Patent Laying-Open No. 03-159964
PTD 3: Japanese Patent Laying-Open No. 54-033510
PTD 4: Japanese Patent Laying-Open No. 08-047801
PTD 5: Japanese Patent Publication No. 49-027518
PTD 6: Japanese Patent Laying-Open No. 11-246271
PTD 7: Japanese Patent Laying-Open No. 2015-205789

SUMMARY OF INVENTION

A method of producing a boron nitride polycrystal according to one embodiment of the present disclosure includes: a first step of obtaining a thermally treated powder by performing a thermal treatment onto a powder of a high pressure phase boron nitride at more than or equal to 1300° C.; and a second step of obtaining a boron nitride polycrystal by sintering the thermally treated powder under a condition of 8 to 20 GPa and 1200 to 2300° C.

A boron nitride polycrystal according to one embodiment of the present disclosure includes a cubic boron nitride, the cubic boron nitride having an average grain size of less than or equal to 25 nm, a ratio b/a being less than or equal to 0.07 in measurement of Knoop hardness at 23° C.±5° C. under a test load of 4.9 N, the ratio b/a being a ratio between a length a of a longer diagonal line and a length b of a shorter diagonal line of a Knoop indentation.

Each of a cutting tool, a wear-resisting tool, and a grinding tool according to one embodiment of the present disclosure includes the above-described boron nitride polycrystal.

DETAILED DESCRIPTION

Problem to be Solved by the Present Disclosure

Patent Document 5 discloses a method of obtaining a cBN sintered material under conditions of 6 GPa and 1100° C. In this method, particles of hBN, which is a source material, need to be of less than or equal to 3 μm, so that the hBN tends to include several mass % of boron oxide impurity and adsorption gas. In such a cBN sintered material, sintering insufficiently proceeds due to an influence of the impurity and adsorption gas, and hardness, strength, and thermal resistance become low due to the inclusion of oxide. This makes it difficult to use the cBN sintered material as a cutting tool, a wear-resistant tool, and the like.

Patent Document 6 discloses a method of producing a cBN polycrystal using a low-crystallinity hBN as a source material under conditions of 6 to 7 GPa and 1550 to 2100° C. This cBN polycrystal has a crystal grain size of about 0.1 to 1 μm. However, in this cBN polycrystal, sinterability is low because such a small grain size useful for finish processing, precision processing, and the like is obtained by setting the sintering temperature at a low temperature. Accordingly, strength is low, and toughness is also low because the grain size is small, with the result that chipping is likely to occur.

Patent Document 7 discloses a method of producing a tough cubic boron nitride polycrystal having fine grains, using a fine-particle hBN having a particle size of 0.5 μm as a source material. Although it is difficult to pulverize a hBN due to its high slidability, this method requires a step of pulverizing a coarse-particle hBN in order to prepare the fine-particle hBN. Furthermore, since fine-particle hBN has a small particle size, impurities such as oxygen and moisture, which are atmospheric constituents, are likely to be adsorbed thereto. Accordingly, in producing a cubic boron nitride polycrystal using such fine-particle hBN as a source material, oxygen serves to hinder conversion thereof to cBN and the moisture and catalytic action of hydrogen in the moisture promote abrupt grain growth of cBN. The impurities also cause decreased hardness and strength of the cubic boron nitride polycrystal. Hence, productivity is low in the method of producing a fine-grain, tough cubic boron nitride polycrystal using fine-particle hBN. In Patent Document 7, a cubic boron nitride polycrystal having fine grains of less than or equal to 25 nm is not obtained. Hence, it is difficult to use it for ultra-precision processing or the like.

In view of the above, the present disclosure has an object to provide: a method of producing a tough boron nitride polycrystal having a fine structure; the boron nitride polycrystal; a cutting tool; a wear-resisting tool; and a grinding tool.

Advantageous Effect of the Present Disclosure

According to the description above, there can be provided: a method of producing a tough boron nitride polycrystal having a fine structure; the boron nitride polycrystal; a cutting tool; a wear-resisting tool; and a grinding tool.

Description of Embodiments

First, embodiments of the present invention are listed and described.

[1] A method of producing a boron nitride polycrystal according to one embodiment of the present disclosure includes: a first step of obtaining a thermally treated powder by performing a thermal treatment onto a powder of a high pressure phase boron nitride at more than or equal to 1300° C.; and a second step of obtaining a boron nitride polycrystal by sintering the thermally treated powder under a condition of 8 to 20 GPa and 1200 to 2300° C. With such a configuration, a tough boron nitride polycrystal having a fine structure can be produced.

[2] In the method of producing the boron nitride polycrystal, the thermal treatment is preferably performed at less than or equal to 2100° C. in the first step. Accordingly, a tough boron nitride polycrystal having a fine structure can be produced efficiently.

[3] The high pressure phase boron nitride is preferably a cubic boron nitride. Accordingly, a tough boron nitride polycrystal having a fine structure can be produced more efficiently.

[4] The high pressure phase boron nitride is preferably a wurtzite type boron nitride. Accordingly, a tough boron nitride polycrystal having a fine structure can be also produced more efficiently.

[5] A boron nitride polycrystal according to one embodiment of the present disclosure includes a cubic boron nitride, the cubic boron nitride having an average grain size of less than or equal to 25 nm, a ratio b/a being less than or equal to 0.07 in measurement of Knoop hardness at 23° C.±5° C. under a test load of 4.9 N, the ratio b/a being a ratio between a length a of a longer diagonal line and a length b of a shorter diagonal line of a Knoop indentation. With such a configuration, the boron nitride polycrystal has a fine structure and becomes tough.

[6] In the measurement of the Knoop hardness, the Knoop hardness is preferably 40 to 60 GPa. Accordingly, a tougher boron nitride polycrystal having a finer structure can be obtained.

[7] The boron nitride polycrystal preferably includes more than or equal to 0.01 volume % of a wurtzite type boron nitride. Accordingly, a further tougher boron nitride polycrystal having a further finer structure can be obtained.

[8] The boron nitride polycrystal preferably includes more than or equal to 0.01 volume % to less than or equal to 0.5 volume % of a compressed hexagonal boron nitride. Accordingly, a further tougher boron nitride polycrystal having a further finer structure can be also obtained.

[9] A cutting tool according to one embodiment of the present disclosure preferably includes the boron nitride polycrystal recited above. Accordingly, a cutting tool including a tough boron nitride polycrystal having a fine structure can be obtained. This cutting tool is useful to cut an iron-based material.

[10] A wear-resisting tool according to one embodiment of the present disclosure preferably includes the boron nitride polycrystal recited above. Accordingly, a wear-resisting tool including a tough boron nitride polycrystal having a fine structure can be obtained. This wear-resistant tool is useful to process an iron-based material.

[11] A grinding tool according to one embodiment of the present disclosure preferably includes the boron nitride polycrystal recited above. Accordingly, a grinding tool including a tough boron nitride polycrystal having a fine structure can be obtained. This grinding tool is useful to grind an iron-based material.

Details of Embodiments

The following describes an embodiment (hereinafter, referred to as "the present embodiment") of the present invention more in detail.

Here, in the present specification, the expression "A to B" represents a range of upper to lower limits (i.e., more than or equal to A and less than or equal to B). When no unit is indicated for A and a unit is indicated only for B, the unit of A is the same as the unit of B. Moreover, when a compound or the like is expressed by a chemical formula in the present specification and an atomic ratio is not particularly limited, it is assumed that all the conventionally known atomic ratios are included. The atomic ratio is not necessarily limited only to one in the stoichiometric range. In the present specification, the terms "grain size" and "particle size" mean an average grain size and an average particle size unless otherwise particularly defined.

<<Method of Producing Boron Nitride Polycrystal>>

As a result of diligent study, the present inventors have obtained a thermally treated powder by thermally treating a powder of a high pressure phase boron nitride at a predetermined temperature. The present inventors have found that a tough boron nitride polycrystal having a fine structure is obtained by: using this thermally treated powder as a starting material and converting it into a cubic boron nitride or both a cubic boron nitride and a wurtzite type boron nitride at a high temperature and a high pressure; and sintering the cubic boron nitride or both the cubic boron nitride and the wurtzite type boron nitride. In this way, the present invention has been completed.

Thus, a method of producing a boron nitride polycrystal according to the present embodiment includes: a first step of obtaining a thermally treated powder by performing a thermal treatment onto a powder of a high pressure phase boron nitride at more than or equal to 1300° C.; and a second step of obtaining a boron nitride polycrystal by sintering the thermally treated powder under a condition of 8 to 20 GPa and 1200 to 2300° C. The boron nitride polycrystal obtained by this production method has the cubic boron nitride with a fine grain size or both the cubic boron nitride and wurtzite type boron nitride with fine grain sizes, and is tough.

Here, in the present specification, the term "high pressure phase boron nitride" refers to a boron nitride thermodynamically stable or metastable under a high pressure. Specifically, the term "high pressure phase boron nitride" refers to a boron nitride thermodynamically stable or metastable within a cubic boron nitride stable region in a P (pressure)-T (temperature) phase diagram generally known for a boron nitride. The cubic boron nitride stable region is a region located at a high-pressure side relative to a cubic boron nitride (cBN)-hexagonal boron nitride (hBN) equilibrium line in the P (pressure)-T (temperature) phase diagram. More specifically, the term "high pressure phase boron nitride" refers to a cubic boron nitride, a wurtzite type boron nitride, and a compressed hBN. On the other hand, each of the terms "normal pressure phase boron nitride" and "normal pressure type boron nitride" refers to a boron nitride thermodynamically stable or metastable under a normal pressure. Specifically, each of the terms "normal pressure phase boron nitride" and "normal pressure type boron nitride" refers to a boron nitride thermodynamically stable or metastable within a hexagonal boron nitride stable region in the above-described P (pressure)-T (temperature) phase diagram for a boron nitride. The hexagonal boron nitride stable region is a region located at a low-pressure side relative to the cBN-hBN equilibrium line in the above-described P (pressure)-T (temperature) phase diagram. More specifically, a hexagonal boron nitride, an amorphous boron nitride, a rhombohedral BN (rBN), a BN (tBN) having a turbostratic structure, and the like are included in the boron nitride thermodynamically stable or metastable under the normal pressure. A BN nanotube (source material used in Comparative Example 4) and a boron nitride sintered material (source material used in Comparative Example 5) as described below are also included in the boron nitride thermodynamically stable or metastable under the normal pressure.

<First Step>

The method of producing the boron nitride polycrystal according to the present embodiment includes the first step of obtaining a thermally treated powder by performing a thermal treatment onto a powder of a high pressure phase boron nitride (for example, a boron nitride powder composed of one or two or more of a cubic boron nitride, a wurtzite type boron nitride, and a compressed hBN) at a temperature of more than or equal to 1300° C. Further, in the method of producing the boron nitride polycrystal, the thermal treatment is preferably performed at less than or equal to 2100° C. in the first step. In the method of producing the boron nitride polycrystal according to the present embodiment, the high pressure phase boron nitride is converted into the normal pressure phase boron nitride (hereinafter, also referred to as "thermally treated boron nitride") by thermally treating the high pressure phase boron nitride powder at more than or equal to 1300° C. and less than or equal to 2100° C. in the first step, thereby obtaining the thermally treated powder (i.e., powder, which is an aggregate of crystal grains of the thermally treated boron nitride).

The thermally treated boron nitride has a crystal state maintained to be thermodynamically stable or metastable under the normal pressure. However, the shape of each of the crystal grains of the thermally treated boron nitride has a shape that can be described as a spherical shape or a polygonal shape with rounded corners unlike the shape of the hexagonal boron nitride, which is one of boron nitrides maintained to be thermodynamically stable or metastable under the normal pressure. Further, the thermally treated boron nitride, which has the spherical or polygonal shape as described above, has substantially no dangling bond, whereby atmospheric constituents such as oxygen and moisture are less likely to be adsorbed thereto as compared with the hexagonal boron nitride. The atmospheric constituents are less likely to be adsorbed to the thermally treated boron nitride as compared with an amorphous boron nitride, which is another boron nitride maintained to be thermodynamically stable or metastable under the normal pressure. Accordingly, the thermally treated boron nitride powder (i.e., thermally treated powder) is readily managed, whereby a tough boron nitride polycrystal having a fine structure can be produced efficiently.

The high pressure phase boron nitride is preferably a cubic boron nitride. Further, the high pressure phase boron nitride is preferably a wurtzite type boron nitride. Since the composition of the high pressure phase boron nitride is one of the cubic boron nitride and the wurtzite type boron nitride, a tough boron nitride polycrystal having a fine structure can be produced more efficiently.

Here, the composition of the high pressure phase boron nitride can be checked in accordance with an X-ray diffraction method. For example, an X-ray diffractometer (product name: "X'pert" provided by Spectris) can be used. Conditions of this device on this occasion may be set, for example, as follows.

Characteristic X ray: Cu—K$\alpha$ (wavelength of 1.54 Å)
Tube voltage: 45 kV
Tube current: 40 mA
Filter: multilayer mirror
Optical system: concentration method
X-ray diffraction method: $\theta$-2$\theta$ method.

In the first step, the grain size of the crystal grain of the high pressure phase boron nitride should not be limited in particular, but is preferably more than or equal to 10 nm and less than or equal to 10 mm in view of production efficiency. A thermal treatment temperature differs depending on the grain size of the crystal grain of the high pressure phase boron nitride. It is preferable to set a lower thermal treatment temperature as the grain size is smaller. However, if the thermal treatment is performed at a temperature of less than 1300° C., the high pressure phase boron nitride is not converted into the thermally treated boron nitride. If the thermal treatment is performed at a temperature of more than 2100° C., the crystal grains of the thermally treated boron nitride become close to the structure of the hexagonal boron nitride, and tend to be abruptly grown in this case. This may result in large grain sizes. Hence, the thermal treatment temperature in the first step is desirably less than or equal to 2100° C. Further, the thermal treatment in the first step is preferably performed within 2 hours.

The thermal treatment is desirably performed in an atmosphere with a small amount of oxygen or an atmosphere including no oxygen, such as vacuum or argon atmosphere. If the high pressure phase boron nitride powder is thermally treated under an oxygen atmosphere, the thermally treated powder is oxidized, with the result that the conversion thereof into the cubic boron nitride and the wurtzite type boron nitride tends to be hindered in the below-described second step and the strength of the boron nitride polycrystal to be obtained in the second step tends to be low.

Further, the thermal treatment is desirably performed until the high pressure phase boron nitride is completely converted in the first step; however, the high pressure phase boron nitride may partially remain in the thermally treated powder. A permitted remaining amount thereof differs depending on the grain size of the boron nitride in the thermally treated powder. For example, when the grain size of the boron nitride in the thermally treated powder is 10 to 100 nm, the remaining amount is preferably less than or equal to 50 volume % in order to obtain a boron nitride polycrystal having a grain size of several ten nm in the second step. When the grain size of the boron nitride in the thermally treated powder is more than 100 nm to 5 μm, the remaining amount is preferably less than or equal to 30 volume %. When the grain size of the boron nitride in the thermally treated powder is more than 5 μm, the remaining amount is preferably less than or equal to 10 volume %.

The grain size (average grain size) of each of the high pressure phase boron nitride and the thermally treated boron nitride can be determined by an intercept method employing a scanning electron microscope (SEM). Specifically, the SEM is first employed to observe each of the high pressure phase boron nitride and the thermally treated boron nitride at a magnification of ×1000 to ×30000, thereby obtaining an SEM image.

Next, a circle is drawn on the SEM image and then eight straight lines are radially drawn from the center of the circle to the outer circumference of the circle in such a manner that intersecting angles between the straight lines become substantially equal to one another. On this occasion, the observation magnification and the diameter of the circle are preferably set such that about 10 to 50 boron nitride grains (crystal grains) are on each straight line.

Further, the number of crystal grain boundaries of the boron nitride crossed by each of the straight lines is counted, and then the length of the straight line is divided by the number thereof to find an average intercept length. Then, the average intercept length is multiplied by 1.128, and the resulting value is regarded as the average grain size (this method is compliant with a method of calculating a nominal grain size in the ASTM specification).

For the average grain size of each of the high pressure phase boron nitride and the thermally treated boron nitride, it is preferable to employ three SEM images and determine the average grain size for each image by the above-described method to obtain an average value of the average grain sizes.

The shape of the crystal grain of the thermally treated boron nitride can be specified using the above-described SEM image.

<Second Step>

The method of producing the boron nitride polycrystal according to the present embodiment includes the second step of obtaining a boron nitride polycrystal by sintering the thermally treated powder under a condition of 8 to 20 GPa and 1200 to 2300° C. In the boron nitride polycrystal obtained by this second step, grains of the cubic boron nitride and wurtzite type boron nitride are fine and the boron nitride polycrystal is tough.

The pressure needs to be 8 to 20 GPa and the temperature needs to be 1200 to 2300° C. in the second step. Particularly, a temperature condition of more than 2300° C. is not preferable because grain growth is facilitated, whereas a temperature condition of less than 1200° C. is not preferable because unconverted thermally treated boron nitride may remain in the boron nitride polycrystal. If the temperature is less than 1200° C., a below-described ratio b/a of less than or equal to 0.07 tends to be unsatisfied. The ratio b/a is a ratio of diagonal lines of a Knoop indentation, which is a physical property of the boron nitride polycrystal. Further, if the pressure condition is of less than 8 GPa, a large amount of unconverted thermally treated boron nitride remains in the boron nitride polycrystal, with the result that the below-described ratio b/a of less than or equal to 0.07 tends to be unsatisfied. The ratio b/a is a ratio of diagonal lines of a Knoop indentation, which is a physical property of the boron nitride polycrystal. On the other hand, the upper limit of the pressure does not need to be particularly limited, but is set at 20 GPa in view of a technical reason for the device (ultra high pressure and high temperature generator).

The pressure and temperature in the second step are preferably applied for 1 minute to 20 minutes. If it is shorter than 1 minute, sintering is insufficient. If it is longer than 20 minutes, there is no difference in sintering state, which is disadvantageous economically. More preferably, they are applied for 10 to 20 minutes.

The second step is a step of converting the thermally treated powder obtained in the first step into the cubic boron nitride or both the cubic boron nitride and the wurtzite type boron nitride, and sintering the cubic boron nitride or both the cubic boron nitride and the wurtzite type boron nitride. In this step, the boron nitride in the thermally treated powder is directly converted into the cubic boron nitride or both the cubic boron nitride and the wurtzite type boron nitride without using both a sintering auxiliary agent and a catalyst. Normally, in the second step, the conversion into the cubic boron nitride and the conversion into both the cubic boron nitride and the wurtzite type boron nitride proceed at the same time as the sintering.

The boron nitride polycrystal obtained by the second step is tough because the grain sizes of the cubic boron nitride and wurtzite type boron nitride included therein are fine and the boron nitride polycrystal exhibits an elastic behavior to improve chipping resistance. Hence, the boron nitride polycrystal can be used suitably for an application of high-speed micro-processing involving a large load, such as a base material for a cutting tool, a wear-resistant tool, a grinding tool, or the like.

<<Boron Nitride Polycrystal>>

The boron nitride polycrystal according to the present embodiment includes a cubic boron nitride, and the cubic boron nitride has an average grain size of less than or equal to 25 nm. In the boron nitride polycrystal above, the ratio b/a is less than or equal to 0.07 in measurement of Knoop hardness at 23° C.±5° C. under a test load of 4.9 N, the ratio b/a being a ratio between a length a of a longer diagonal line and a length b of a shorter diagonal line of a Knoop indentation. Further, in the measurement of the Knoop hardness, the Knoop hardness is preferably 40 to 60 GPa. Accordingly, the boron nitride polycrystal has a fine structure and becomes tough.

The boron nitride polycrystal includes substantially no binder, sintering auxiliary agent, catalyst, and the like. Accordingly, the disadvantages of the conventional cBN sintered material can be overcome which result from inclusion of at least one of a binder, a sintering auxiliary agent, and a catalyst.

As long as the boron nitride polycrystal includes the cubic boron nitride, impurities may be included therein to such an extent that the effect of the present embodiment is exhibited. Examples of the impurities include nitrogen (N), hydrogen (H), oxygen (O), and the like. The contents of the impurities are desirably as follows: a content of each impurity is less than 1000 ppma (parts per million atomic) and a total content of the impurities is less than 2000 ppma. A boron nitride polycrystal in which the total content of the impurities is more than 2000 ppma has a decreased strength due to voids generated in the polycrystal based on the impurities. Further, the total content of the impurities tends to be more than 2000 ppma if the boron nitride polycrystal obtained in the second step is left in an atmosphere, i.e., under an oxygen atmosphere or highly humid atmosphere. For example, the total content of the impurities becomes more than 2000 ppma if the boron nitride polycrystal is left for one day under an atmospheric environment having a relative humidity of more than or equal to 60%.

The content of each impurity can be measured by a secondary ion mass spectrometry (SIMS), for example. When the content of each of the impurities can be measured using the SIMS, analysis can be performed, for example, under the following conditions.

Measuring device: Product name (item number): "IMS-7f" provided by CAMECA
Primary ion species: cesium ($Cs^+$)
Primary acceleration voltage: 15 kV
Detection region: 30 ($\mu m\phi$)
Measurement accuracy: ±40% (2σ).

Here, the boron nitride polycrystal according to the present embodiment is a sintered material. However, normally, a sintered material is intended to include a binder. For this reason, in order to explicitly distinguish from a product including a binder, the term "polycrystal" is used in the present specification instead of the term "sintered material".

Further, the method of producing the boron nitride polycrystal configured as above should not be limited in particular. However, the boron nitride polycrystal according to the present embodiment can be efficiently produced by using the above-described method of producing the boron nitride polycrystal.

<Cubic Boron Nitride>

The cubic boron nitride has an average grain size of less than or equal to 25 nm. The cubic boron nitride preferably has an average grain size of less than or equal to 20 nm, and more preferably has an average grain size of less than 20 nm. Since a smaller average grain size of the cubic boron nitride is more preferable, the lower limit thereof should not be defined. However, it is preferable to set the lower limit at 1 nm in view of a difficulty in distinguishing from an amorphous boron nitride. Since the cubic boron nitride is included therein, the boron nitride polycrystal has a high hardness and is also excellent in thermal stability and chemical stability. Further, since the cubic boron nitride has a small grain size of less than or equal to 25 nm, the cubic boron nitride can be widely applied to an application involving a large load, a micro-processing application, and the like when used for a tool or the like.

The respective grain sizes of the cubic boron nitride in the boron nitride polycrystal are preferably uniform in order to achieve no stress concentration and achieve high strength. Hence, the respective grain sizes of the crystal grains of the cubic boron nitride preferably exhibit a normal distribution with a narrow deviation. When the deviation of the grain sizes is large or the grain sizes are not uniform, stress is concentrated on deviated portions, thus resulting in a low strength. In the present application, the expression "grain size of cubic boron nitride" represents the grain size of a crystal grain of the cubic boron nitride included in the boron nitride polycrystal.

Instead of the scanning electron microscope used for the method of measuring the average grain size of each of the high pressure phase boron nitride and the thermally treated boron nitride, a transmission electron microscope (TEM) is employed to determine the grain size (average grain size) of the cubic boron nitride in accordance with the intercept method. The TEM is employed to observe the boron nitride polycrystal at a magnification of ×200000 to ×500000 so as to obtain a TEM image. A circle is drawn on the TEM image. Thereafter, the average grain size can be determined through the same procedure as that in the method of measuring the average grain size of each of the high pressure phase boron nitride and the thermally treated boron nitride.

Also for the average grain size of the cubic boron nitride, it is preferable to employ three TEM images and determine the average grain size for each image by the above-described method to obtain an average value of the average grain sizes.

<Knoop Hardness>

In the boron nitride polycrystal according to the present embodiment, the ratio b/a is less than or equal to 0.07 in measurement of Knoop hardness at 23° C.±5° C. under a test load of 4.9 N, the ratio b/a being a ratio between a length a of a longer diagonal line and a length b of a shorter diagonal line of a Knoop indentation. Further, in the measurement of the Knoop hardness, the Knoop hardness is preferably 40 to 60 GPa.

The Knoop hardness thus measured is defined in, for example, JIS Z 2251:2009, and is known as one of measures representing the hardness of an industrial material. The measurement of the Knoop hardness is performed to determine the hardness of a target material by pressing a Knoop indenter to the target material under a predetermined temperature and a predetermined load (test load).

The Knoop indenter refers to an indenter composed of diamond and having a shape of quadrangular prism having a bottom surface with a shape of rhomboid. The rhomboid of the bottom surface is defined to satisfy a ratio b/a of 0.141, the ratio b/a being a ratio between length a of the longer diagonal line and length b of the shorter diagonal line. Moreover, the Knoop indentation refers to a mark left in the target material at a portion on which the Knoop indenter is pressed under the above-described temperature and test load and from which the Knoop indenter is released just after the pressing.

One feature of the boron nitride polycrystal according to the present embodiment lies in that the ratio b/a (less than or equal to 0.07) in the Knoop indentation is smaller than the original ratio b/a (0.141) in the Knoop indenter. This feature means that the target material (i.e., boron nitride polycrystal in the present embodiment) behaves elastically and experiences recovery (elastic recovery) taking place in the indentation toward elastically reverting to the original form.

Figure 1:
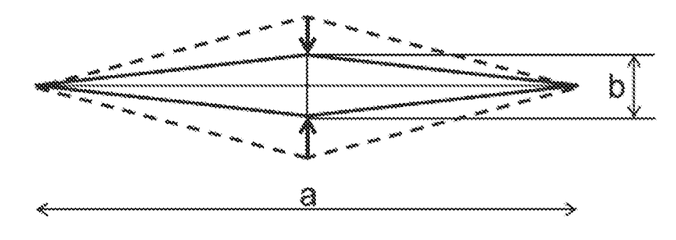
FIG. 1 illustrates a Knoop indentation.

The following describes a phenomenon in connection with the above-described elastic recovery with reference to FIG. 1, which conceptually shows the Knoop indentation. For example, if the target material exhibits no elastic recovery at all, the cross section of the Knoop indenter and the Knoop indentation have the same shape, which is a rhomboid indicated by a broken line as "original Knoop indentation" in FIG. 1. However, in the Knoop indentation of the boron nitride polycrystal according to the present embodiment, the elastic recovery is likely to take place in the direction of arrow in the figure and the Knoop indentation thereof is therefore in the form of a rhomboid indicated by a solid line in the figure. In other words, it is indicated that: the value of the ratio b/a becomes smaller as the reversion in the direction of arrow in the figure becomes larger; and as this value is smaller, the elastic recovery (elasticity) is larger.

The boron nitride polycrystal according to the present embodiment has a large elastic recovery since the ratio b/a in the Knoop indentation is less than or equal to 0.07. As the elastic recovery is larger, toughness becomes higher. Hence, the boron nitride polycrystal becomes tough. As described above, the ratio b/a in the Knoop indentation can serve as an index indicating how large or small the elastic recovery of the boron nitride polycrystal is.

In the boron nitride polycrystal according to the present embodiment, a small ratio b/a in the Knoop indentation is preferable because the elastic recovery becomes large to some extent by a small value of the ratio b/a. Further, the large elastic recovery is preferable because elasticity becomes large to allow for elastic deformation of a cutting edge in the case of cutting that requires ultra-precision, whereby a diffraction phenomenon (so-called "iridescent pattern") resulting from a cutting trace that poses a problem in processing a mirror surface or the like is less likely to be caused. For this reason, the lower limit of the ratio b/a should not be defined; however, if the elastic recovery becomes too large, the elastic deformation during the processing becomes large when used as a tool, with the result that processability tends to be deteriorated. In view of this, the lower limit of the ratio b/a is preferably set at 0.04. In the boron nitride polycrystal according to the present embodiment, the ratio b/a in the Knoop indentation is further preferably 0.05 to 0.07.

<Wurtzite Type Boron Nitride>

The boron nitride polycrystal according to the present embodiment preferably includes more than or equal to 0.01 volume % of wurtzite type boron nitride (wBN). Accordingly, the structure of the boron nitride polycrystal becomes denser. Although the upper limit of the content of the wurtzite type boron nitride should not be defined in particular, the upper limit is preferably less than or equal to 70 volume % in view of a below-described characteristic of the wurtzite type boron nitride. Since the wurtzite type boron nitride is included in the boron nitride polycrystal, a crack tends to be hindered from being developed and toughness tends to be improved. However, the wurtzite type boron nitride is a metastable phase in transition from the hexagonal boron nitride to the cubic boron nitride, and is therefore less stable and has a lower wear resistance than the cubic boron nitride. Hence, a more preferable range of the content of the wurtzite type boron nitride is 0.01 to 20 volume %.

When the boron nitride polycrystal includes the wurtzite type boron nitride, a plurality of crystal grains of the cubic boron nitride and a plurality of crystal grains of the wurtzite type boron nitride are distributed with respect to one another in the polycrystal. In such a distributed state, the crystal grains of the cubic boron nitride are bonded to one another firmly, the crystal grains of the wurtzite type boron nitride are bonded to one another firmly, and the crystal grains of the cubic boron nitride and wurtzite type boron nitride are bonded to one another firmly, whereby the boron nitride polycrystal has a dense structure.

In a boron nitride polycrystal including more than or equal to 0.01 volume % of the wurtzite type boron nitride and a remainder of the cubic boron nitride and impurities, the cubic boron nitride can have an average grain size of about 5 to 25 nm.

<Compressed Hexagonal Boron Nitride>

The boron nitride polycrystal of the present embodiment preferably includes 0.01 to 0.5 volume % of the compressed hexagonal boron nitride (compressed hBN). Accordingly, development of crack is hindered and toughness is improved. Since the compressed hBN is included, sintering can be performed in a wide temperature range, thus resulting in improved productivity. However, if more than 0.5 volume % of the compressed hBN is included therein, stress is concentrated on the compressed hBN, with the result that the strength tends to be decreased. The boron nitride polycrystal of the present embodiment more preferably includes more than or equal to 0.01 volume % and less than or equal to 0.1 volume % of the compressed hBN, and further preferably includes more than or equal to 0.05 volume % and less than or equal to 0.1 volume % of the compressed hBN. The term "compressed hexagonal boron nitride" refers to a hexagonal boron nitride with a narrower plane interval in C-axis than an ordinary one.

Moreover, in the boron nitride polycrystal, the content of the normal pressure type boron nitride is preferably less than or equal to 0.1 volume %. This is because when the content of the normal pressure type boron nitride is more than 0.1 volume %, the strength may be decreased significantly. The term "normal pressure type boron nitride" refers to a hBN, a rhombohedral BN (rBN), a BN (tBN) having a turbostratic structure, and an amorphous boron nitride. Therefore, the expression "the content of the normal pressure type boron nitride is less than or equal to 0.1 volume %" means that the total content of these boron nitrides is less than or equal to 0.1 volume %.

The composition of the boron nitride polycrystal and the volume ratio of the components in the composition of the boron nitride polycrystal can be checked in accordance with the X-ray diffraction method, and can be measured using the above-described X-ray diffractometer (product name: "X'pert" provided by Spectris). Conditions of the device on this occasion may be set, for example, as follows.

Characteristic X ray: Cu—Kα (wavelength of 1.54 Å)
Tube voltage: 45 kV
Tube current: 40 mA
Filter: multilayer mirror
Optical system: concentration method
X-ray diffraction method: θ-2θ method.

<<Cutting Tool, Wear-Resisting Tool, and Grinding Tool>>

Because the boron nitride polycrystal according to the present embodiment includes a cubic boron nitride having crystal grains with a fine grain size and is tough, it is suitable to use the boron nitride polycrystal for a cutting tool, a wear-resistant tool, a grinding tool, or the like. In other words, each of the cutting tool, wear-resistant tool, and grinding tool according to the present embodiment is preferably provided with the above-described boron nitride polycrystal.

Each of the cutting tool, the wear-resisting tool and the grinding tool according to the present embodiment may be entirely constituted of the boron nitride polycrystal, or only a portion thereof (for example, a cutting edge portion in the case of the cutting tool) may be constituted of the boron nitride polycrystal. Moreover, a coating film may be formed on a surface of each of the tools.

Examples of the cutting tool according to the present embodiment includes a drill, an end mill, an indexable cutting insert for drill, an indexable cutting insert for end mill, an indexable cutting insert for milling, an indexable cutting insert for turning, a metal saw, a gear cutting tool, a reamer, a tap, a cutting bite, and the like.

Examples of the wear-resistant tool according to the present embodiment include a die, a scriber, a scribing wheel, a dresser, and the like. Examples of the grinding tool according to the present embodiment include a grinding stone and the like.

EXAMPLES

While the present invention will be described in more detail with reference to Examples, the present invention is not limited thereto.

Examples 1 to 10

<Preparation of Thermally Treated Powder>

In order to produce boron nitride polycrystals of Examples 1 to 10, thermally treated powders were first prepared by the following methods. First, high pressure phase boron nitride powders having compositions and grain sizes shown in Table 1 were thermally treated in vacuum at temperature conditions shown in Table 1. Accordingly, thermally treated boron nitride powders (that is, thermally treated powders) indicated as source materials A to F in Table 1 were prepared (first step).

<Production of Boron Nitride Polycrystal>

Next, source materials A to F were placed in capsules each composed of a refractory metal (material: tantalum) and were held for 20 minutes under temperature and pressure conditions shown in Table 2 using an ultra high pressure and high temperature generator, whereby each of source materials A to F was converted into a cubic boron nitride or both a cubic boron nitride and a wurtzite type boron nitride and was sintered (second step). Accordingly, boron nitride polycrystals of Examples 1 to 10 were obtained. When measured using a below-described measurement method, the boron nitride polycrystal of Example 5 included an amount of compressed hexagonal boron nitride (compressed hBN) as shown in Table 2.

TABLE 1

|  | Composition of High Pressure Phase Boron Nitride Powder | Grain Size of High Pressure Phase Boron Nitride Powder | Thermal Treatment Temperature | Shape of Crystal Grain of Thermally Treated Boron Nitride |
|---|---|---|---|---|
| Source Material A | cBN | 50 nm | 1600° C. | Spherical Shape |
| Source Material B | cBN | 100 nm | 1400° C. | Spherical Shape |
| Source Material C | cBN | 500 nm | 1750° C. | Polygonal Shape |
| Source Material D | cBN | 10 μm | 2000° C. | Polygonal Shape |
| Source Material E | wBN | 100 nm | 1600° C. | Spherical Shape |
| Source Material F | wBN | 10 μm | 1850° C. | Polygonal Shape |

TABLE 2

|  | Source Material | Synthesis Condition | | Composition (Volume %) | | | Average Grain Size (nm) | Knoop Hardness (GPa) | Knoop Indentation (Ratio b/a) |
|---|---|---|---|---|---|---|---|---|---|
|  |  | Pressure (GPa) | Temperature (° C.) | cBN | Compressed hBN | wBN |  |  |  |
| Example 1 | A | 20 | 1300 | 50 | 0 | 50 | 5 | 51 | 0.050 |
| Example 2 | A | 15 | 1800 | 90 | 0 | 10 | 8 | 48 | 0.060 |
| Example 3 | A | 8 | 2300 | 100 | 0 | 0 | 25 | 43 | 0.070 |
| Example 4 | B | 10 | 2000 | 98 | 0 | 2 | 10 | 46 | 0.063 |
| Example 5 | B | 8 | 2100 | 99.14 | 0.06 | 0.8 | 15 | 45 | 0.068 |
| Example 6 | C | 10 | 2000 | 97 | 0 | 3 | 10 | 46 | 0.061 |
| Example 7 | D | 10 | 2000 | 98 | 0 | 2 | 11 | 47 | 0.062 |
| Example 8 | E | 10 | 2000 | 97 | 0 | 3 | 10 | 45 | 0.062 |
| Example 9 | F | 10 | 2000 | 98 | 0 | 2 | 12 | 45 | 0.063 |
| Example 10 | C | 10 | 1800 | 97 | 0.5 | 2.5 | 11 | 39 | 0.069 |
| Comparative Example 1 | A | 10 | 2400 | 100 | 0 | 0 | 200 | 41 | 0.093 |
| Comparative Example 2 | A | 20 | 1150 | 50 | 10 | 40 | 4 | 30 | 0.101 |
| Comparative Example 3 | Coarse-Particle hBN Powder | 10 | 2100 | 98.5 | 0 | 1.5 | 191 | 43 | 0.091 |
| Comparative Example 4 | BN Nanotube | 15 | 1800 | 95 | 0 | 5 | 9 | 42 | 0.080 |
| Comparative Example 5 | cBN/Metal Binder | 7 | 1800 | 100 (Except for Binder) | 0 | 0 | 2000 | 33 | 0.113 |

Comparative Examples 1 and 2

A boron nitride polycrystal according to each of Comparative Examples 1 and 2 was produced by the following method. Specifically, source material A was placed in the above-described capsule and was held for 20 minutes under temperature and pressure conditions shown in Table 2 using an ultra high pressure and high temperature generator as shown in Table 2, whereby source material A was converted into a cubic boron nitride or both a cubic boron nitride and a wurtzite type boron nitride and was sintered. Accordingly, a boron nitride polycrystal of each of Comparative Examples 1 and 2 was obtained. When measured using the below-described measurement method, the boron nitride polycrystal of Comparative Example 2 included an amount of compressed hexagonal boron nitride (compressed hBN) as shown in Table 2.

Here, the composition of the high pressure phase boron nitride powder used in each of Examples 1 to 10 and Comparative Examples 1 and 2 was specified by the above-described method, i.e., the X-ray diffraction method employing the X-ray diffractometer. Further, the respective grain sizes of these high pressure phase boron nitrides were also determined by the above-described intercept method employing the scanning electron microscope (SEM). The respective shapes of the crystal grains of the thermally treated powders (source materials A to E) were also specified by the method employing the above-described SEM image.

Comparative Example 3

A boron nitride polycrystal of Comparative Example 3 was produced by the following method. First, instead of the thermally treated powders (source materials A to F) of Examples 1 to 10, a commercially available hexagonal boron nitride powder having a particle size of less than or equal to 5 µm (hereinafter, also referred to as "coarse-particle hBN powder", as also described in Table 2).

Next, this coarse-particle hBN was placed in the above-described capsule and was held for 20 minutes under temperature and pressure conditions shown in Table 2 using the ultra high pressure and high temperature generator, thereby converting the coarse-particle hBN powder into a cubic boron nitride and a wurtzite type boron nitride and sintering them. Accordingly, a boron nitride polycrystal of Comparative Example 3 was obtained.

Comparative Example 4

A boron nitride polycrystal of Comparative Example 4 was produced by the following method. First, instead of the thermally treated powders (source materials A to F) of Examples 1 to 10, a commercially available BN nanotube powder having a grain size of less than or equal to 20 nm (hereinafter, also referred to as "BN nanotube", as also described in Table 2).

Next, this BN nanotube powder was placed in the above-described capsule and was held for 20 minutes under temperature and pressure conditions shown in Table 2 using the ultra high pressure and high temperature generator, thereby converting the BN nanotube powder into a cubic boron nitride and a wurtzite type boron nitride and sintering them. Accordingly, a boron nitride polycrystal of Comparative Example 4 was obtained.

Comparative Example 5

A cubic boron nitride sintered material of Comparative Example 5 was produced by the following method. First, instead of the thermally treated powders (source materials A to F) of Examples 1 to 10, there was prepared a powder of a mixture (hereinafter, also referred to as "cBN/metal binder" as also described in Table 2) in which a commercially available cubic boron nitride powder and a commercially available Co-based metal binder powder each having an average particle size of less than or equal to 2 µm are mixed.

Next, this cBN/metal binder powder was placed in the above-described capsule, and was sintered by holding the cBN/metal binder powder using the ultra high pressure and high temperature generator for 20 minutes under temperature and pressure conditions shown in Table 2. Accordingly, a cubic boron nitride sintered material of Comparative Example 5 was obtained.

<<Evaluation>>

The composition, grain size, Knoop hardness, and ratio b/a in Knoop indentation of each of the boron nitride polycrystals of Examples 1 to 10 and Comparative Examples 1 to 4 and the cubic boron nitride sintered material of Comparative Example 5 were measured by below-described methods.

<Composition>

The composition and volume ratio of each of the cubic boron nitride (cBN), compressed hexagonal boron nitride (compressed hBN), and wurtzite type boron nitride (wBN) included in each of the boron nitride polycrystals of Examples 1 to 10 and Comparative Examples 1 to 4 and the cubic boron nitride sintered material of Comparative Example 5 were identified using the above-described X-ray diffractometer (product name: "X'pert" provided by Spectris) under the above-described conditions. That is, this device had an X-ray radiation source, which was Cu and provided Kα ray having a wavelength of 1.54 Å. The result is shown in the column "Composition (Volume %)" of Table 2. In Comparative Example 5, the composition of each of the above-described boron nitrides was determined without taking into consideration the volume ratio of the metal binder included in the cubic boron nitride sintered material.

Further, the contents of the impurities in the boron nitride polycrystals of Examples 1 to 10 and Comparative Examples 1 to 4 were measured by the above-described method employing the SIMS. The cubic boron nitride sintered material of Comparative Example 5 included the metal binder and was therefore not subjected to the analysis by the SIMS. As a result, the contents of the impurities in the boron nitride polycrystals of Examples 1 to 10 and Comparative Examples 1 to 3 were as follows: less than or equal to 800 ppma of hydrogen; less than or equal to 200 ppma of nitrogen; and less than or equal to 30 ppma of oxygen. The boron nitride polycrystal of Comparative Example 4 contained more than or equal to 3000 ppma of hydrogen as an impurity.

<Grain Size>

The average grain size of the cubic boron nitride included in each of the boron nitride polycrystals of Examples 1 to 10 and Comparative Examples 2 and 4 was determined by the intercept method employing the TEM image. The magnification of the TEM on this occasion was ×200000. This is due to the following reason. That is, when the magnification is less than ×200000, there are too many crystal grains in one viewing field, with the result that grain boundaries become less identifiable and tend to be wrongly counted, which leads to a large error in measured grain sizes. Also, when the magnification is more than ×200000, there are too few crystal grains in one viewing field, with the result that the average grain size cannot be precisely determined. The magnification of the TEM used for the measurement of the average grain size of each of the cubic boron nitrides in Comparative Examples 1 and 3 was set at ×30000 because the grain sizes thereof were large. The magnification of the TEM used for measurement of the average grain size of the cubic boron nitride in Comparative Example 5 was set at ×3000 because the grain size thereof is larger than that of the cubic boron nitrides of each of Comparative Examples 1 and 3.

Moreover, three TEM images captured in one sample at separate portions were used for each of the Examples and Comparative Examples, an average grain size was determined by the above-described method for each TEM image, and the average value of the three average grain sizes obtained was regarded as an average grain size of the cubic boron nitride in each of the Examples and Comparative Examples. The result is shown in the column "Average Grain Size" in Table 2.

<Knoop Hardness and Ratio b/a in Knoop Indentation>

The Knoop hardness and ratio b/a in Knoop indentation of each of the boron nitride polycrystals of Examples 1 to 10 and Comparative Examples 1 to 4 and the cubic boron nitride sintered material of Comparative Example 5 were measured under the following conditions.

That is, a micro Knoop indenter (vertex angles of 172.5° and 130° and a diagonal line length ratio of 1:7.11) was used as a Knoop indenter, and the Knoop hardness was measured 5 times at 23° C.±5° C. under a test load of 4.9 N. From results of measurement performed 5 times, an average value of three values except for the smallest and largest values was determined and regarded as the Knoop hardness in each of the Examples and Comparative Examples. The results are shown in the column "Knoop Hardness" in Table 2.

Further, for each measurement, a laser microscope (product name: "ols3000" provided by Olympus) was used to measure the ratio b/a between length a of a longer diagonal line and length b of a shorter diagonal line of the Knoop indentation, and the average value thereof was regarded as the ratio b/a in the Knoop indentation. The results are shown in the column "Knoop Indentation (Ratio b/a)" in Table 2. From the results of measurement performed 5 times for the Knoop indentation, an average value of three values except for the smallest and largest values was also determined.

As shown in Table 2, it was confirmed that each of Examples 1, 2, and 4 to 10 contained 0.8 to 50 volume % of the wurtzite type boron nitride (wBN). The average grain size of the cubic boron nitride of each of Examples 1 to 10 was 5 to 25 nm. On this occasion, the ratio b/a in the Knoop indentation in each of Examples 1 to 10 was 0.050 to 0.070. From the above, it is understood that the boron nitride polycrystal of each of Examples 1 to 10 has a fine structure and is tough.

Particularly, the boron nitride polycrystal of each of Examples 1 to 9 has a Knoop hardness of more than or equal to 40 GPa, and is understood to be tougher also in view of the results of the average grain size of the cubic boron nitride and the ratio b/a in Knoop indentation.

On the other hand, in Comparative Example 1, the average grain size of the cubic boron nitride was 200 nm and the ratio b/a in Knoop indentation was 0.093. In Comparative Example 2, the content of the compressed hexagonal boron nitride was 10 volume %, and the b/a ratio in Knoop indentation was 0.099. In Comparative Example 3 employing the coarse-particle hBN powder as the source material, the average grain size of the cubic boron nitride was 191 nm and the b/a ratio in Knoop indentation was 0.091.

In Comparative Example 4 employing the BN nanotube as the source material, the average grain size was 9 nm, which was comparable to those in Examples 1 to 10, but the ratio b/a in Knoop indentation was 0.080. This is presumably due to the following reason: since the BN nanotube is produced from a gas including hydrogen, a large amount of hydrogen is included therein during the production thereof. In the impurity measurement (SIMS analysis) in Comparative Example 4, more than or equal to 3000 ppma of hydrogen was contained. In Comparative Example 5 employing, as the source material, the powder in which the cubic boron nitride powder and the metal binder were mixed, the average grain size was 2000 nm and the ratio b/a in Knoop indentation was 0.113. Therefore, it is understood that all the boron nitride polycrystals of Examples 1 to 10 have finer structures than those of Comparative Examples 1 to 5 and are tougher than those of Comparative Examples 1 to 5.

<Cutting Performance>

Each of the boron nitride polycrystals of Examples 1 to 10 and Comparative Examples 1 to 4 and the cubic boron nitride sintered material of Comparative Example 5 was attached to the tip of a ball end mill tool having a tip diameter of 0.5 mm. Respective cutting performances thereof were evaluated. Specifically, a hardened steel of HRC 60 was prepared as a material to be cut, and was cut by 24 m under conditions that a rotating speed was 80000 rpm, a cutting speed was 200 mm/min, a cut-in amount was 5 μm, and a feed amount was 3 μm. A wear amount of each of the Examples and the Comparative Examples upon completion of the cutting was shown in Table 3. It can be evaluated that as the wear amount is smaller, the cutting tool (ball end mill tool) including the boron nitride polycrystal or cubic boron nitride sintered material is tougher.

TABLE 3

| | Wear Amount (μm) |
|---|---|
| Example 1 | 2 |
| Example 2 | 3 |
| Example 3 | 5 |
| Example 4 | 5 |
| Example 5 | 4 |
| Example 6 | 6 |
| Example 7 | 4 |
| Example 8 | 6 |
| Example 9 | 5 |
| Example 10 | 6 |
| Comparative Example 1 | 15 |
| Comparative Example 2 | Processing Discontinued due to Occurrence of Large Chipping In Cutting Edge. |
| Comparative Example 3 | 20 |
| Comparative Example 4 | Processing Discontinued due to Occurrence of Large Chipping in Cutting Edge. |
| Comparative Example 5 | 41 |

As shown in Table 3, when the wear amount of Example 1, which is the smallest wear amount, is assumed as a reference, the wear amounts of Examples 2 to 10 fall within a range of wear amounts 1 to 3 times as large as the wear amount of Example 1. On the other hand, in Comparative Examples 2 and 4, large chippings occurred at cutting lengths of 15 m and 11 m respectively and therefore the processing was discontinued. Further, the wear amounts in Comparative Examples 1, 3, and 5 were large, specifically, were respectively 7.5 times, 10 times, 20.5 times as large as the wear amount of Example 1. Therefore, it was confirmed that the cutting tool including each of the boron nitride polycrystals of Examples 1 to 10 is tougher than the cutting tool including the boron nitride polycrystal of each of Comparative Examples 1 to 4 and the cutting tool including the cubic boron nitride sintered material of Comparative Example 5.

Heretofore, the embodiments and examples of the present invention have been illustrated, but it has been initially expected to appropriately combine the configurations of the embodiments and examples and modify them in various manners.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

REFERENCE SIGNS LIST a: length of longer diagonal line of rhombus; b: length of shorter diagonal line of rhombus.

The invention claimed is:

1. A method of producing a boron nitride polycrystal, the method comprising:
    a first step of obtaining a thermally treated powder by performing a thermal treatment onto a powder of a high pressure phase boron nitride at more than or equal to 1300° C.; and
    a second step of obtaining a boron nitride polycrystal by sintering the thermally treated powder under a condition of 8 to 20 GPa and 1200 to 2300° C., wherein
    the thermally treated powder comprises thermally treated boron nitride, and
    crystal grains of the thermally treated boron nitride have a shape described as a spherical shape or a polygonal shape with rounded corners.

2. The method of producing the boron nitride polycrystal according to claim 1, wherein the thermal treatment is performed at less than or equal to 2100° C. in the first step.

3. The method of producing the boron nitride polycrystal according to claim 1, wherein the high pressure phase boron nitride is a cubic boron nitride.

4. The method of producing the boron nitride polycrystal according to claim 1, wherein the high pressure phase boron nitride is a wurtzite type boron nitride.

5. A method of producing a boron nitride polycrystal, the method comprising:
    a first step of obtaining a thermally treated powder by performing a thermal treatment onto a powder of a high pressure phase boron nitride at more than or equal to 1300° C. and less than or equal to 2100° C.; and
    a second step of obtaining a boron nitride polycrystal by sintering the thermally treated powder under a condition of 8 to 20 GPa and 1200 to 2300° C.,
    the high pressure phase boron nitride being a cubic boron nitride or a wurtzite type boron nitride, wherein
    the thermally treated powder comprises thermally treated boron nitride, and
    crystal grains of the thermally treated boron nitride have a shape described as a spherical shape or a polygonal shape with rounded corners.

* * * * *